United States Patent

Wiese

Patent Number: 5,098,353
Date of Patent: Mar. 24, 1992

[54] SPUR GEAR DIFFERENTIAL LOCKABLE TO A LIMITED EXTENT

[75] Inventor: Helmut Wiese, Meisenweg, Fed. Rep. of Germany

[73] Assignee: Viscodrive GmbH, Lohmar, Fed. Rep. of Germany

[21] Appl. No.: 490,079

[22] Filed: Mar. 7, 1990

[30] Foreign Application Priority Data

Mar. 13, 1989 [DE] Fed. Rep. of Germany ....... 3908091

[51] Int. Cl.⁵ ............................................... F16H 1/44
[52] U.S. Cl. ..................................... 475/90; 475/112; 475/156; 475/249; 475/254
[58] Field of Search ............... 475/84, 89, 90, 91, 475/112, 116, 118, 123, 150, 154, 156, 249, 254

[56] References Cited

U.S. PATENT DOCUMENTS

| 1,229,548 | 6/1917 | Van Sant | 475/90 |
| 1,374,603 | 4/1921 | Patten | 475/89 |
| 3,251,244 | 5/1966 | Nickell | 475/90 |
| 3,323,389 | 6/1967 | Hause | 475/84 |
| 4,084,654 | 4/1978 | Dudek | 475/90 X |
| 4,389,908 | 6/1983 | Dudek | 475/90 |
| 4,671,373 | 6/1987 | Sigl | 475/150 X |
| 4,838,118 | 6/1989 | Binkley | 475/150 X |

FOREIGN PATENT DOCUMENTS

| 0298397 | 1/1989 | European Pat. Off. . |
| 1555228 | 12/1970 | Fed. Rep. of Germany . |
| 3542184 | 6/1987 | Fed. Rep. of Germany ........ 475/90 |

Primary Examiner—Allan D. Herrmann
Assistant Examiner—Benjamin Levi
Attorney, Agent, or Firm—Toren, McGeady & Associates

[57] ABSTRACT

A spur gear differential (1) lockable to a limited extent and used as a differential gear for a motor vehicle. The differential makes use of the friction losses resulting from the oil flow conveyed by the teeth and teeth gaps of the planetary gears (6) and the sun gear (2) or the hollow gear (3). For control purposes, a cover ring (16) is provided which may be moved into a close position, i.e. a sealing position, relative to the end face (17) of the gear teeth or away therefrom to throttle or release the oil flow.

6 Claims, 4 Drawing Sheets

SPUR GEAR DIFFERENTIAL LOCKABLE TO A LIMITED EXTENT

BACKGROUND TO THE INVENTION

1. Field of the Invention

This invention is concerned with a spur gear differential which is lockable to a limited extent, comprising a sun gear with external teeth, a hollow gear with internal teeth arranged coaxially to the sun gear, a planetary gear carrier arranged to be rotatable relative to both the sun gear and the hollow gear, and planetary gears carried by the carrier and meshed with the sun gear and the hollow gear.

2. Description of Prior Art

Differrentials constructed as planetary drives with the planetary gears co-operating with one of the central gears to act as a gear pump are known from DE-OS 35 42 184 and U.S. Pat. No. 3,251,244. With both these designs, the effect differs from that of conventional gear pumps because no provision has been made for a supply and discharge end, but the oil conveyed between the tooth gaps is squeezed through the gaps provided in the region of engagement between the gears. These gap losses produce a locking effect.

In other words, the locking effect is achieved as a result of the arrangement and design of the gaps. The disadvantage of the two designs mentioned above is that the locking effect occurs at any speed differential.

However, when using lockable differentials in motor vehicles, there occur operating conditions in which a continuously existing locking effect of a certain magnitude disadvantageously affects the driving behaviour of the vehicle. In particular this applies to using lockable differentials in connection with automatic anti-locking systems for the vehicle wheels.

SUMMARY OF THE INVENTION

It is therefore the object of the present invention to further develop a lockable planetary gear designed as a spur gear differential in such a way that the locking effect is controllable, and especially that it may be partly or wholly eliminated.

The invention provides a spur gear differential which is lockable to a limited extent, comprising a sun gear with external teeth, a hollow gear with internal teeth arranged coaxially to the sun gear, a planetary gear carrier arranged to be rotatable relative to both the sun gear and the hollow gear, and planetary gears carried by the carrier and meshed with the sun gear and the hollow gear, wherein one of the end faces of the planetary gears in the region of the teeth thereof is covered and the other end face of the planetary gears is coverable in the region of engagement with one of the sun and hollow gears by an axially movable cover ring and in the region of engagement with the other of the sun and hollow gears is always open for the entry of oil.

The advantage of this design is that the locking effect is controllable and especially in those cases where the vehicle is equipped with an anti-locking system, it is possible to eliminate the locking effect as a function of the brake operation.

In a further embodiment of the invention, the planetary gear carrier is divided into two portions, one portion being a carrier portion comprising pockets for the planetary gears and the other portion being a cover, the portions being rigidly connected to one another, with the carrier portion additionally comprising a central chamber accommodating the sun gear, and the cover ring being movably received on bearing pins on which the planetary gears are mounted which, extend through the pockets and are supported at both ends by the planetary gear carrier.

The closable chamber intended for building up the pressure is defined by the components forming the planetary gear carrier. In a simple way, the bearing pins required for supporting the planetary gears may also be used for connecting the components to each other.

In a further embodiment of the invention, the region of engagement between the planetary gears and the sun gear is covered by extensions of the cover ring, adapted to the cross-section of the pockets and which, in the region of engagement between the planetary gears and the hollow gear, define a passage for the entry of oil.

Alternatively, it may be provided for the region of engagement between the planetary gears and the hollow gear to be coverable by the extensions of the cover ring which are adapted to the cross-section of the pockets and which, in the region of engagement between the planetary gears and the sun gear, define a passage for the entry of oil.

By sliding on the bearing pins, the cover ring with its extensions may be moved into a close or removed position relative to the regions of engagement to be covered, as a result of which the size of the gaps may be changed. If it is moved closer, which results in a small aperture cross-section, a higher locking torque is obtained. If the cover ring is positioned further away, the aperture cross-sections are larger as a result of which the locking torque which may be generated is reduced to zero.

It is conceivable to provide the cover either in the region of engagement between the teeth of the hollow gear and the planetary gears, i.e. in the radially outer region, or in the region of engagement between the teeth of the sun gear and the planetary gears, i.e. in the radially inner region.

In a further embodiment of the invention, it is proposed that the gap between the cover ring and the region of engagement to be covered should be set by a control element by axial adjustment. For this purpose it is proposed that the cover ring should comprise a groove to permit engagement of a switching fork acted upon by the control elements.

As a preferred application, it is proposed that the spur gear differential should be arranged in the driveline between the vehicle axles to be driven. By changing the locking effect it is possible to divide the driving torques between the two axles and thus between the front and rear wheels.

BRIEF DESCRIPTION OF THE DRAWINGS

Preferred embodiments of the invention are diagrammatically illustrated, by way of example, in the drawings in which.

DESCRIPTION OF PREFERRED EMBODIMENTS

Figure 1:
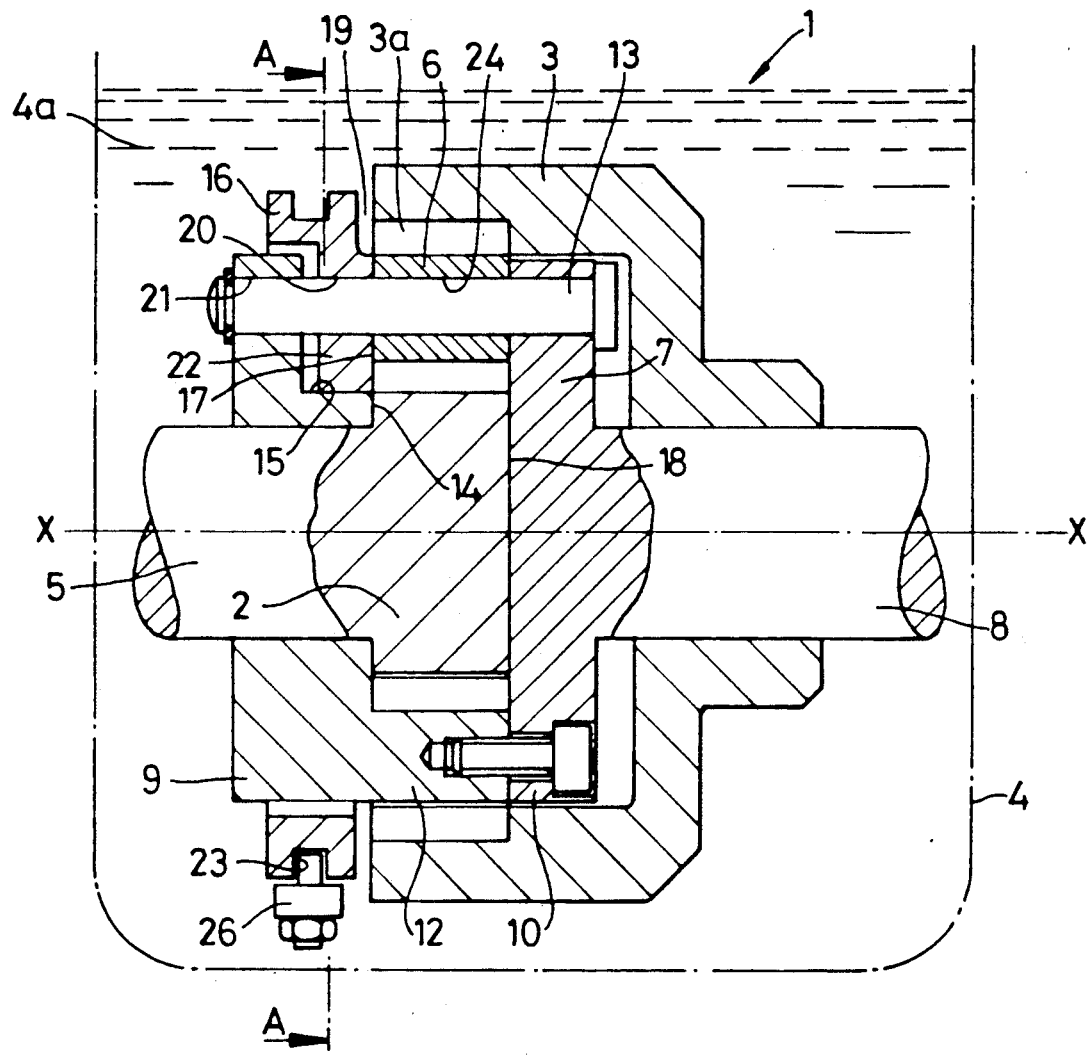
FIG. 1 is a longitudinal section through a spur gear differential.
Figure 2:
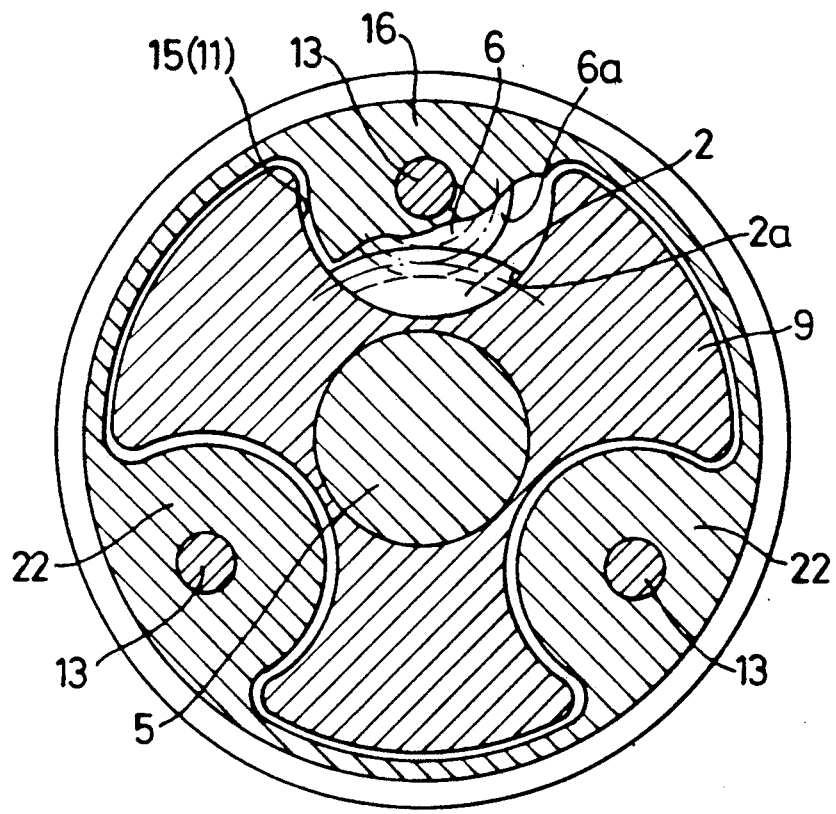
FIG. 2 is a section on the line A—A of FIG. 1.

FIGS. 1 and 2 show a first embodiment of a spur gear differential 1 which is lockable to a limited extent and comprises a sun gear 2 with external teeth supported with its shaft 5 in a housing 4, a planetary gear carrier 7 supported by a carrier shaft 8, a hollow gear 3 with internal teeth supported coaxially relative to an axis X—X of the sun gear shaft 5 and circumferentially distributed planetary gears 6. In the present example, the sun gear shaft 5 preferably serves as the input shaft and the hollow gear 3 as the output. The carrier 7 is arranged to be rotatable relative to both the sun gear 2 and the hollow gear 3 and the planetary gears 6 carried by the carrier 7 are meshed with the sun gear and the hollow gear. The gears 2, 3 and 6 and the carrier 7 are all contained in the housing 4.

The sun gear 2 comprises teeth 2a (FIG. 2) engaging the toothed portions 6a of the planetary gears 6. The toothed portions 6a of the planetary gears 6 engage an internally toothed portion 3a of the hollow gear 3. The interior 4a of the housing 4 is filled with oil which serves to build up a locking torque. The planetary gear carrier 7 is divided into two portions, a carrier portion 9, comprising a portion supported on the sun gear shaft 5 and a projection 12, and a cover portion 10 which is integral with the shaft 8. In the region of the projection 12 there is formed a chamber 14 in which the sun gear is accommodated. The projection 12 also comprises circumferentially distributed pockets 11 (FIG. 2) in which the planetary gears 6 are arranged. The region of the pockets 11 also contains recesses 15 which extend into part of the end face of the carrier element 9 and which for practical purposes represent an extension of the pockets 11. End faces 17 of the gears 2 and 6 face towards the carrier element 9 (to the left viewing FIG. 1). The end faces 18 of the planetary gears 6 and of the sun gear 2 which face away from the carrier element 9 are covered by the cover portion 10. The cover portion 10 is supported on the end face of the projection 12. The carrier portion 9 and the cover portion 10 are rigidly connected together by bearing pins 13. The bearing pins 13 are arranged in the region of the pockets 11. They extend through a bore in the cover portion 10. Bores 24 of the planetary gears 6 are received on the shanks of the pins 13. The other end of the bearing pins 13 projects through a bore 21 of the carrier portion 9 and is secured by a securing ring. The outer faces of the toothed portions 6a of the planetary gears 6 are arranged so as to leave a small gap relative to the inner face of the pockets 11. Small gaps are also provided relative to the end faces 17 and 18. A cover ring 16 has projections 22 which are shaped approximately like the pockets 11 and which, by means of bores 20 on the bearing pins 13, are axially movable in the recess 15. In the embodiment according to FIG. 1, there has been provided an aperture 19 in the cover ring 16 which provides a gap in the region of engagement between the toothed portions 3a and 6a of the hollow gear 3 and the planetary gears 6. The aperture 19 acts as a supply passage by which oil may flow from the interior 4a of the housing 4 into the region between the teeth, which oil (as an outlet has not been provided) is squeezed through the gaps due to the pumping effect resulting from the rotating planetary gears 6 when a speed differential occurs between the hollow gear 3 and the sun gear 2. Thus, one of the end faces 18 of the planetary gears 6 in the region of the teeth 6a thereof is covered by the cover portion 10 and the hollow gear 3 to prevent entry of oil into the gaps between the teeth 2a, 3a and 6a of the planetary gears 6 and the sun and hollow gears 2 and 3. The other end face 17 of the planetary gears 6 is coverable in the region of engagement of the planetary gears 6 with the sun gear 2 by the axially movable cover ring 16 and in the region of engagement with the hollow gear is always open for the entry of oil.

Figure 3:
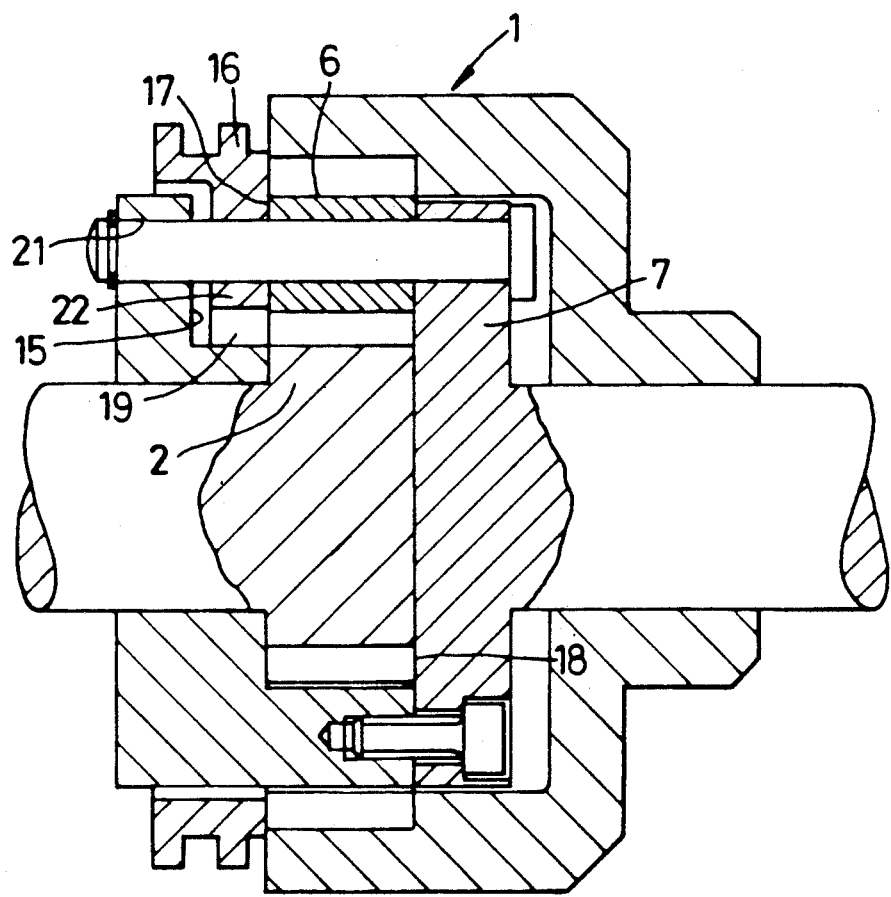
FIG. 3 is a longitudinal section similar to FIG. 1, but of an alternative embodiment.

In the embodiment shown in FIG. 3, the passage 19 in the cover ring 16 is positioned to ensure that the region of engagement of the planetary gears 6 and the sun gear 2 is always open for the entry of oil, whereas the region of engagement of the planetary gears 6 and the hollow gear 3 is coverable. In this embodiment, with the cover ring 16 in the position shown, the extensions 22 seal a large area so that high squeezing losses occur during relative movements. In consequence, a high locking torque is built up. If the differential 1 is intended to behave like a standard open differential, i.e. if it is to permit a relative movement without building up a torque, the cover ring 16 may be moved towards the left away from the contact of its extensions 22 against the faces of the gears 3 and 6, and the cross-section of the aperture 19 is increased. This permits a practically free pumping operation. In other words, the oil reaching the conveying regions of the toothed portions 3a, 6a may leave these regions without a pressure building up.

For actuating the cover ring 16, it has been provided with an annular groove 23 which is engaged by a switching fork 26 (omitted from FIGS. 2 and 3) extending from the housing 4. By actuating the switching fork 26, the cover ring 16, depending on the operating mode required, may be moved either towards the gears 2, 3 and 6 or away from them.

In the embodiment of FIG. 3, the aperture cross-section 19 is associated with the region of the toothed portions 2a and 6a of the sun gear 2 and the planetary gears 6, i.e. it is arranged on a smaller radius, the advantage being that, in particular, the squeezing gaps are positioned in the region of the greater radius, i.e. in the region of engagement between the toothed portions 3a of the hollow gear 3 and 6a of the planetary gears 6. In this way, a higher braking torque is achieved.

By designing the spur gear differential 1 as a kind of gear pump in the case of which, however, the fluid is pressed through the gaps to achieve friction losses, it is intended, with an increasing speed differential between the driving shaft, for example the sun gear shaft 5 and the hollow gear 3, to brake the balancing function taken over by the planetary gear carrier 7 in order to transmit a torque to the more slowly rotating shaft or the stationary shaft.

Figure 4:
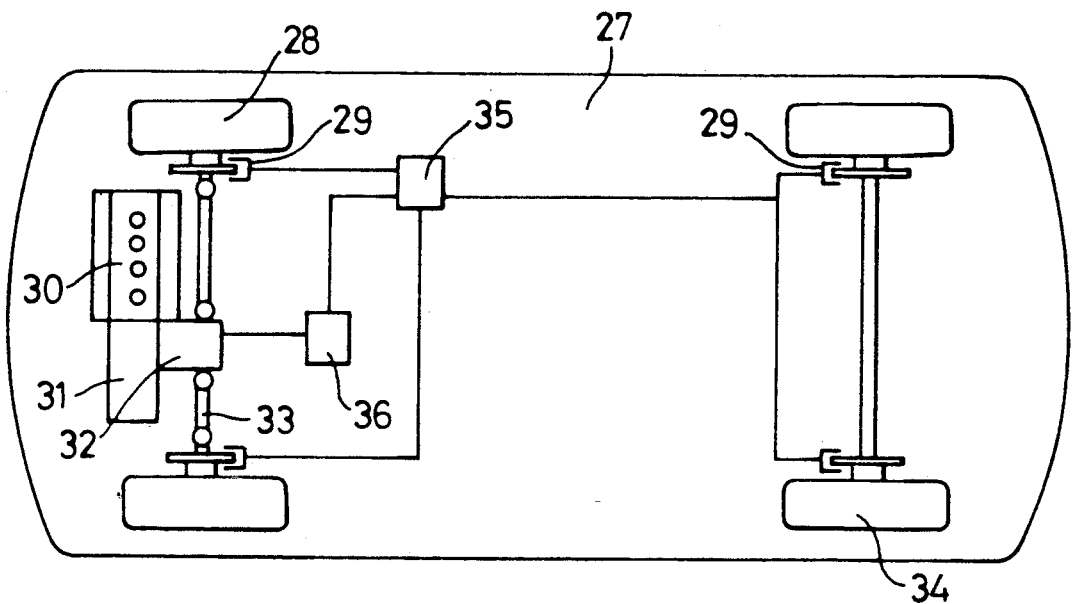
FIG. 4 illustrates a drive concept for a front wheel drive vehicle.
Figure 5:
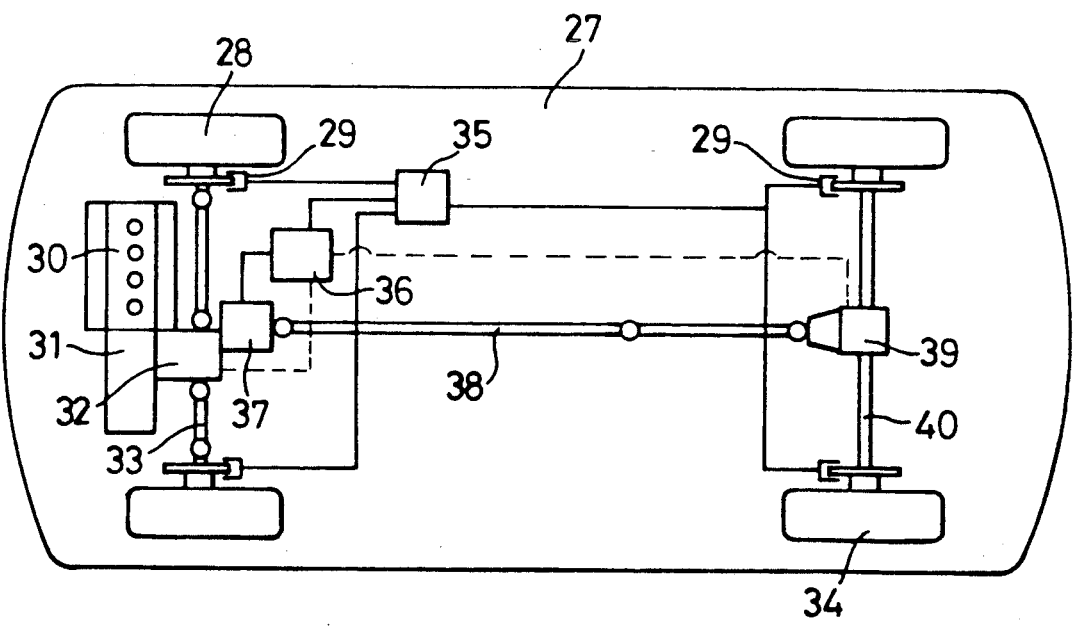
FIG. 5 shows a drive concept for a four wheel drive vehicle.

FIGS. 4 and 5 show applications for such a spur gear differential 1. In the embodiment according to FIG. 4 a front wheel drive vehicle 27 can be seen. The two front wheels 28 are driven by the engine 30 by means of the gear box 31, the front axle differential 32 and the front side shafts 33. The two rear wheels 34 are not driven.

The front axle differential 32 may be designed in accordance with the spur gear differential 1 as illustrated in FIGS. 1 to 3, with the hollow gear 3, for example, being driven by the engine 30 via the gear box 31. One of the two front wheels 28 may be connected by one of the front side shafts 33 to the sun gear shaft 5 associated with the sun gear 2, whereas the other front wheel 28 may be in torque connection with the carrier shaft 8 connected to the planetary gear carrier 7 by the other side shaft 33. For controlling the position of the cover ring 16 relative to the end faces 17 and thus its movement into a closer position in order to achieve a smaller cross-section for the aperture 19 or into a position further away in order to achieve a larger cross-section, there have been provided control means which, as a function of the operation of the brake, release a switching pulse. The braking system including the brakes 29 associated with the wheels 28, 34 comprises a control unit 35 which is connected to a control unit 36 for the front axle differential 32. When operating the brakes 29, the control unit 35 releases a pulse which causes the control unit 36 to move the cover ring 16 into a position away from the end face 17 in order to transfer the spur gear differential into an open mode of operation. Under normal conditions, i.e. when the brakes 29 are not operated, the cover ring 16 is close to the end face 17, so that if at one of the two front wheels 28 there occurs, relative to the surface on which the vehicle 27 is moved, an adhesion coefficient which is lower than that of the other front wheel 28, the wheel with the higher adhesion coefficient would stop and the other one on the smoother surface would spin. This means that the vehicle 27 would not be able to move. As a result of the spinning of the wheel 28, there occurs a relative movement between the planetary gear carrier 7 and the sun gear 2 and thus relative to the hollow gear 3. In consequence, the oil is conveyed into the toothed portions 2a, 3a and 6a, as a result of which a braking torque is built up which causes the stationary front wheel to move.

If this condition occurred at a high speed of the vehicle 27, this could lead to the vehicle 27 going out of control, especially when the operating brake 29 is actuated. This is the reason why the control unit 35 and the control unit 36 ensure that, upon operation of the brakes 29, the front axle differential 32 behaves like an open differential in that the cover ring 16 is transferred into a position where a pressure build up by the conveyed oil is prevented.

FIG. 5 illustrates a four wheel drive vehicle in the case of which an additional spur gear differential according to FIGS. 1 to 3 is incorporated in the driveline between the front axle and the rear axle. i.e. between the front wheels 28 and the rear wheels 34. The intermediate axle differential has been given the reference number 37 and is driven by the front axle differential 32, whereas it itself, by means of the propeller shaft 38 drives the rear axle differential 39 and the two rear wheels 34 via rear side shafts 40. Again, there have been provided control means in the form of the control units 35 and 36 which, in addition to controlling the locking effect of the front axle differential 32, effect the control of the intermediate axle differential 37 and, if necessary, the rear axle differential 39.

I claim:

1. A spur gear differential which is lockable to a limited extent, comprising a sun gear with external teeth, a hollow gear with internal teeth arranged coaxially to the sun gear, a planetary gear carrier arranged to be rotatable relative to both the sun gear and the hollow gear, and planetary gears carried by the carrier and meshed with the sun gear and the hollow gear, wherein the planetary gears have end faces, one of which end faces in the region of the teeth thereof is covered in the region of engagement with one of the sun and hollow gears, and the other end face of the planetary gears is coverable in the same region of engagement by an axially movable cover ring moveable in response to control means, which as a function of operation of a vehicle brake, releases a switching pulse so as to permit external alternation of locking effect, and a region of engagement with the other of the sun and hollow gears is always open for the entry of oil on a side of the other end face and is covered by said hollow gear in the one end face.

2. A spur gear differential according to claim 1, wherein the planetary gear carrier is divided into two portions, one portion being a carrier portion comprising pockets for the planetary gears and the other portion being a cover, the portions being rigidly connected to one another, with the carrier portion additionally comprising a central chamber accommodating the sun gear, and the cover ring being movably received on bearing pins on which the planetary gears are mounted which, extend through the pockets and are supported at both ends by the planetary gear carrier.

3. A spur gear differential according to claim 2, wherein the region of engagement between the planetary gears and the sun gear may be covered by extensions of the cover ring, adapted to the cross-section of the pockets, and which, in the region of engagement between the planetary gears and the hollow gear, define a passage for the entry of oil.

4. A spur gear differential according to claim 2, wherein the region of engagement between the planetary gears and the hollow gear are covered by extensions of the cover ring, adapted to the cross-section of the pockets, and which, in the region of engagement between the planetary gears and the sun gear, define a passage for the entry of oil.

5. A spur gear differential according to claim 1, wherein a gap exists between the cover ring and the region of engagement to be covered, which gap may be set by by control means by axial adjustment.

6. A spur gear differential according to claim 5, wherein the cover ring defines a groove to permit engagement of a switching fork acted upon by the control means.

* * * * *